Patented May 6, 1941

2,240,963

UNITED STATES PATENT OFFICE 2,240,963

LIGHTWEIGHT SYNTHETIC STONE AND PROCESS OF MAKING IT

John W. Swezey and Paul W. Jones, La Fayette, Ind., assignors to Rostone Corporation, La Fayette, Ind., a corporation of Indiana No Drawing. Application May 6, 1938, Serial No. 206,472

7 Claims. (Cl. 18—47.5)

It is the object of our invention to produce a lightweight synthetic stone which is especially suitable for internal construction and which will have wide application in construction work.

Heavy, dense, stone-like products of high strength have been manufactured by producing a reaction between finely ground argillaceous materials, an alkaline-earth base, and water in an amount just sufficient to produce the desired chemical reaction. The argillaceous materials were shales, slates, and certain clays, which are composed wholly or in substantial part of aluminosilicic acids; and the alkaline-earth base was such a base as lime or magnesia, most conveniently hydrated. Such stone-like products, made by thoroughly mixing the materials, forming them into desired shapes either by hand or in molds as in ordinary ceramic practice, and subjecting them to moist heat during which they become indurated (hardened), are known under the trade-mark "Rostone", and are produced by methods such as those set forth in United States patents to Peffer et al., Nos. 1,852,672, 1,877,959, and 1,877,960.

We have discovered that if we increase the amount of water to several times that necessary for reaction, use an argillaceous material that is sufficiently rich in aluminosilicic acids and has relatively little free silica, maintain that excess of water in the material by moist heat throughout a single-stage induration during which the internal structure formed early in the induration is not impaired or destroyed by any agitation such as stirring, and permit the escape of the water by drying only after the stirring-free induration is substantially complete, we are able to produce a lightweight synthetic-stone product which has sufficient strength for wide indoor application; but which is very different in its characteristics both from the heavy, dense products of said Peffer et al. patents, and from the chalky products which are produced when there is destruction of internal structure by stirring at an intermediate stage in induration as in the Hüttemann Patent No. 1,932,971.

In order to obtain our desired lightweight synthetic-stone product of suitable strength, certain precautions should be observed, as follows:

1. The argillaceous materials must be selected so that they are rich in aluminosilicic acids and have relatively little free silica. The percentage of free silica in these argillaceous materials should not exceed 20% as a maximum, and for best results should not be in excess of 10%. The argillaceous materials, such as shales, slates, and clays, should have a content of aluminosilicic acids at least in excess of 50%, and desirably in excess of 60%.

2. The alkaline-earth base may be either lime or magnesia, or a mixture (dolomitic) of the two, initially either hydrated or non-hydrated although hydration should of course be complete before molding; and is most conveniently simply hydrated lime.

3. The argillaceous materials and the alkaline-earth base may vary considerably in their proportions to each other, from a minimum of about 20 parts to a maximum of about 125 parts of the alkaline-earth base for each 100 parts of the argillaceous material; and both must be finely pulverized.

4. The amount of water should be at least 75% by weight of the combined weights of the argillaceous material and the alkaline-earth base; and may vary from that minimum to as much as 300% or even 400% by weight of the combined weight of the argillaceous material and the alkaline-earth base. The greater the amount of water that is used, and that is retained during the induration, the lighter the weight of the final product after drying.

5. For best results, the argillaceous material must be used with substantially no preliminary roasting, for by expelling water such roasting destroys the argillaceous character of such material and tends to reduce the strength of the final product.

6. The induration must be in a single stage, by which we mean that internal structure formed in an earlier part of the induration must not be destroyed by stirring or other agitation and that any desired molding must be done before any setting has occurred; for if there is partial induration or setting, and that is destroyed by reshaping as by stirring or beating the partially hardened slurry, the strength of the final product is markedly lessened. In other words, care should be taken that no structural strength produced even by initial hardening should be destroyed; for its destruction, even if the material is to some extent thixotropic, lessens the strength of the final product.

7. The induration or hardening step must be carefully carried out so that little or no water is permitted to escape, for the presence of the excess water in the thoroughly mixed mass causes the material to harden into a microscopically honeycombed mass with water in the pores to create that honeycombed structure. Only after the induration has been completed, by the hardening of that honeycombed structure, is the material subjected to drying; which drives out the water from the pores of that honeycombed mass, and leave a quite porous structure that has very considerable strength if the essentials of the process as outlined above are observed.

It is possible, if desired, to increase the lightness by whipping air into the slurry immediately before the induration step. This makes larger pores. But we prefer to increase the number of pores by increasing the amount of water rather than by whipping in air, for thereby we are able to get a more uniform product and greater fineness of pores.

It is also possible to mix with the slurry various fibrous materials, organic or mineral, for increasing the strength of the final product by reason of the tensile strength of the fibers. Whether or not such fibers are used is a matter of choice. Among the fibers which may be used are cotton, wool, paper, wood, hemp, sisal, bagasse, mineral wool, glass fibers, and asbestos. When such fibers are used, it is desirable to increase the quantity of water used, because the fibers absorb water and thus leave less available for forming the pores during the period of induration.

It is also possible to mix a light-weight filler with the slurry prior to induration. Among such fillers are such things as heat-expanded vermiculite (such as "Unifil," "Zonolite," etc.), or the so-called "Haydite" (produced by heating certain clays or shales to a critical temperature at which they expand and then quickly cooling the expanded material to maintain expanded volume after the cooling), or light-weight slags. The proportions of filler to slurry may be varied, from zero up to as much as five volumes of filler per volume of slurry. When "Haydite" or other porous filler is used, however, the amount of water used in the slurry is increased to compensate for the absorption of water by the filler; just as it is when water-absorbent fibers are used.

Both fillers and fibers may be used if desired.

The following are examples of slurry compositions which we may use, with the parts by weight.

Example 1:

| | Parts |
|---|---|
| Pulverized shale | 100 |
| Pulverized lime, hydrated | 60 |
| Water | 120 to 600 |

Example 2:

| | Parts |
|---|---|
| Ground slate or shale | 100 |
| Ground lime, hydrated | 50 to 80 |
| "Haydite" | 100 to 600 |
| Water | 250 to 800 |

Example 3:

| | Parts |
|---|---|
| Pulverized clay or shale | 100 |
| Ground lime (or magnesia), hydrated | 60 to 90 |
| Fiber | ¼ to 40 |
| Water | 125 to 800 |

In any of these examples, the two fundamental solid materials (the argillaceous and alkaline-earth materials) are pulverized, separately or together, and are mixed together and with the water without being preliminarily subjected to heating to drive off any volatile matter. The whole is carefully mixed into a slurry, which is too thin to hold shape by itself. Air may be whipped into the slurry if desired, and any desired fibers and fillers are added and thoroughly mixed into the slurry.

When the slurry is thus prepared, it is molded into desired shapes without any preliminary hardening. This may be done by pouring the slurry into molds of desired character, care being taken to make sure that the molds are filled.

The molds with the slurry in them are put into an autoclave, and there subjected for several hours to steam under pressure, desirably of about 50 to 100 lbs. By reason of the heat of the steam, the argillaceous and alkaline-earth materials in the slurry react with each other and with the water to form a hardened microscopically honeycombed structure, with water (and some air if air is whipped in) in those microscopic pores, and with any fibers and fillers present bonded firmly into the mass. The water, present in excess, is prevented from leaving the structure during the induration period by reason of the steam under pressure; for the steam holds that water in the pores. No stirring or other agitation that tends to destroy internal structure is done during the induration period, which is thus a single-stage induration.

After the induration has occurred, and the hardened microscopically honeycombed structure has been produced, the molds are removed from the autoclave, and the hardened shapes are removed from the molds and are subjected to drying to drive off the entrapped water; which leaves a light microscopically porous material of very considerable strength.

We claim as our invention:

1. The process of making a lightweight synthetic stone, which consists in making an intimate mixture of the following ingredients:

(a) Pulverized argillaceous material that contains at least 50% of alumino-silicic acids and not in excess of 20% free silica_ 100 parts by weight
(b) Pulverized alkaline-earth base _ 20 to 125 parts by weight
(c) Water _ 75% to 400% of a and b together, to form a thin slurry, with the solid ingredients used in that slurry including the volatile matter that might be driven off by calcination, immediately after said mixing and prior to any appreciable setting of the mixture, pouring said slurry into molds to produce the desired shapes, subjecting the molds containing the slurry to a single-stage induration in which the temperature is raised to at least the boiling point of water but the water is prevented from leaving the slurry and during which the slurry is kept free from any stirring that would destroy internal structure, and after induration has been produced subjecting the hardened shapes to drying to drive off the entrapped water and leave a microscopically honeycombed lightweight solid.

2. The process of making a lightweight synthetic stone, which consists in making an intimate mixture of the following ingredients:

(a) Pulverized argillaceous material that contains at least 50% of alumino-silicic acids and not in excess of 20% free silica_ 100 parts by weight
(b) Pulverized alkaline-earth base _ 20 to 125 parts by weight
(c) Water _ 75% to 400% of a and b together, to form a thin slurry, immediately after said mixing and prior to any appreciable setting of the mixture, pouring said slurry into molds to produce the desired shapes, subjecting the molds containing the slurry to a single-stage induration in which the temperature is raised to at least the boiling point of water but the water is prevented from leaving the slurry and during which the slurry is kept free from any stirring that would destroy internal structure, and after induration has been produced subjecting the hardened shapes to drying to drive off the entrapped water and leave a microscopically honeycombed lightweight solid.

3. The process of making a lightweight synthetic stone as set forth in claim 2, with the addition that fibrous material is mixed into the slurry in addition to the other ingredients.

4. The process of making a lightweight synthetic-stone product as set forth in claim 2, with the addition that a light filler is mixed into the slurry in addition to the other ingredients.

5. The process of making a lightweight synthetic stone as set forth in claim 2, with the addition that the induration is produced by subjecting the molds containing the slurry to steam under pressure in an autoclave.

6. A lightweight, microscopically honeycombed, synthetic stone, produced by the process set forth in claim 1.

7. A lightweight, microscopically honeycombed, synthetic stone, produced by the process set forth in claim 2.

JOHN W. SWEZEY.
PAUL W. JONES.